Aug. 28, 1928. 1,681,930
S. K. DENNIS
MULTIPLE DISPENSING MECHANISM
Filed Feb. 27, 1926 2 Sheets-Sheet 1

Inventor.
Samuel K. Dennis,
By H. P. Doolittle
Atty.

Aug. 28, 1928.  
S. K. DENNIS  
1,681,930  
MULTIPLE DISPENSING MECHANISM  
Filed Feb. 27, 1926  2 Sheets-Sheet 2
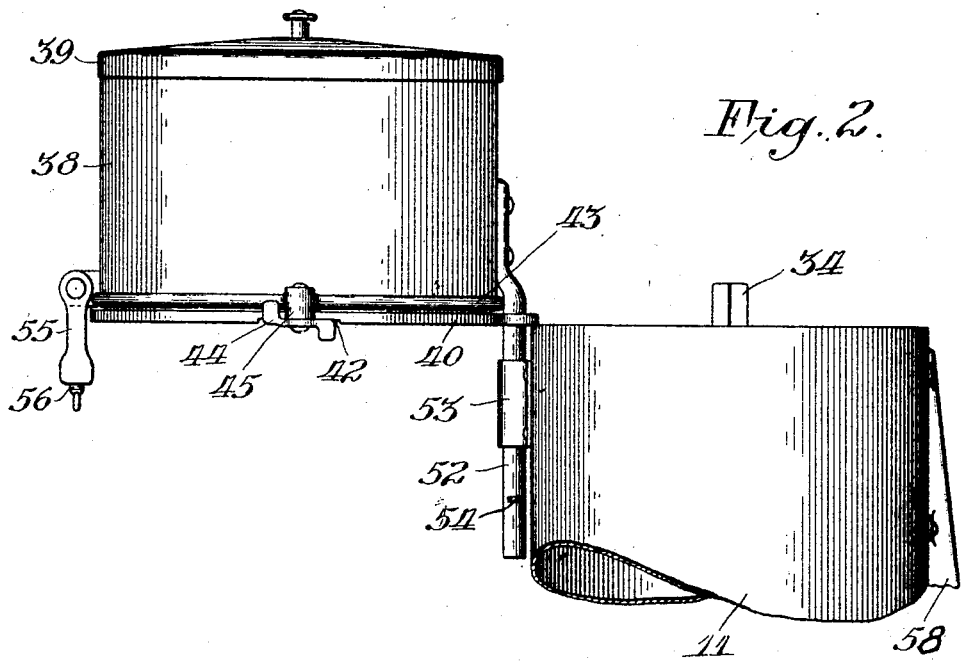
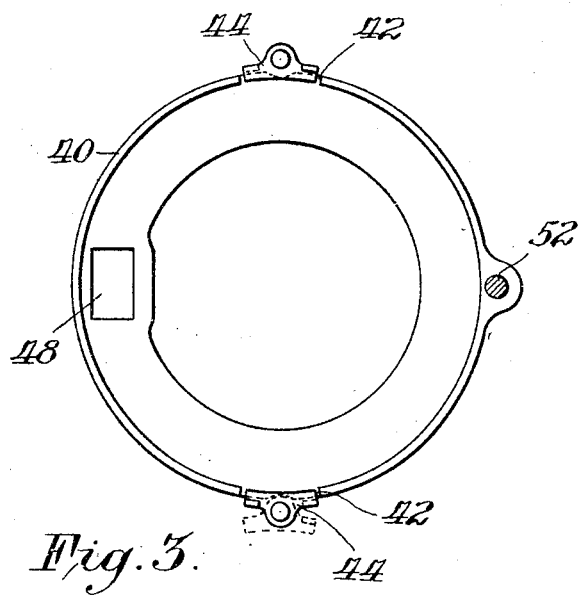
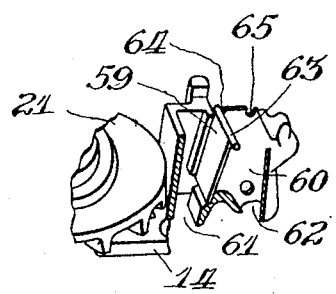
Inventor.  
Samuel K. Dennis,  
By W. P. Dowlette  
Atty.

Patented Aug. 28, 1923.

1,681,930

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

MULTIPLE DISPENSING MECHANISM.

Application filed February 27, 1926. Serial No. 91,010.

This invention relates to improvements in seed dispensing mechanisms and particularly to mechanism for simultaneously dispensing a plurality of different kinds of seeds from different hoppers. The particular dispensing mechanism shown in the accompanying drawings is used extensively to plant corn and peas.

Among its objects, the invention is intended to provide a multiple dispensing mechanism having two hoppers, one of which is located above the other and so arranged with reference thereto that the upper hopper may be moved aside to uncover the lower hopper filling without so tipping the upper hopper that there is liability of spilling its supply of seeds. To this end the illustrative dispensing mechanism presents an upper hopper which is swingable on a vertical axis above the main or lower hopper.

Other objects are to simplify and reduce the number of parts of such mechanisms and to so arrange the parts that the different seeds may be planted alongside each other, or substantially spaced from each other.

Referring to the drawings,—

Fig. 2 is an elevation showing the upper hopper swung aside to allow the replenishment of the supply of seeds in the main hopper;

Fig. 3 is a horizontal section through the base of the upper hopper; and

Fig. 4 is a detail interior perspective view showing the swingable gate governing the course of the seeds discharged from the upper hopper.

Figure 1:
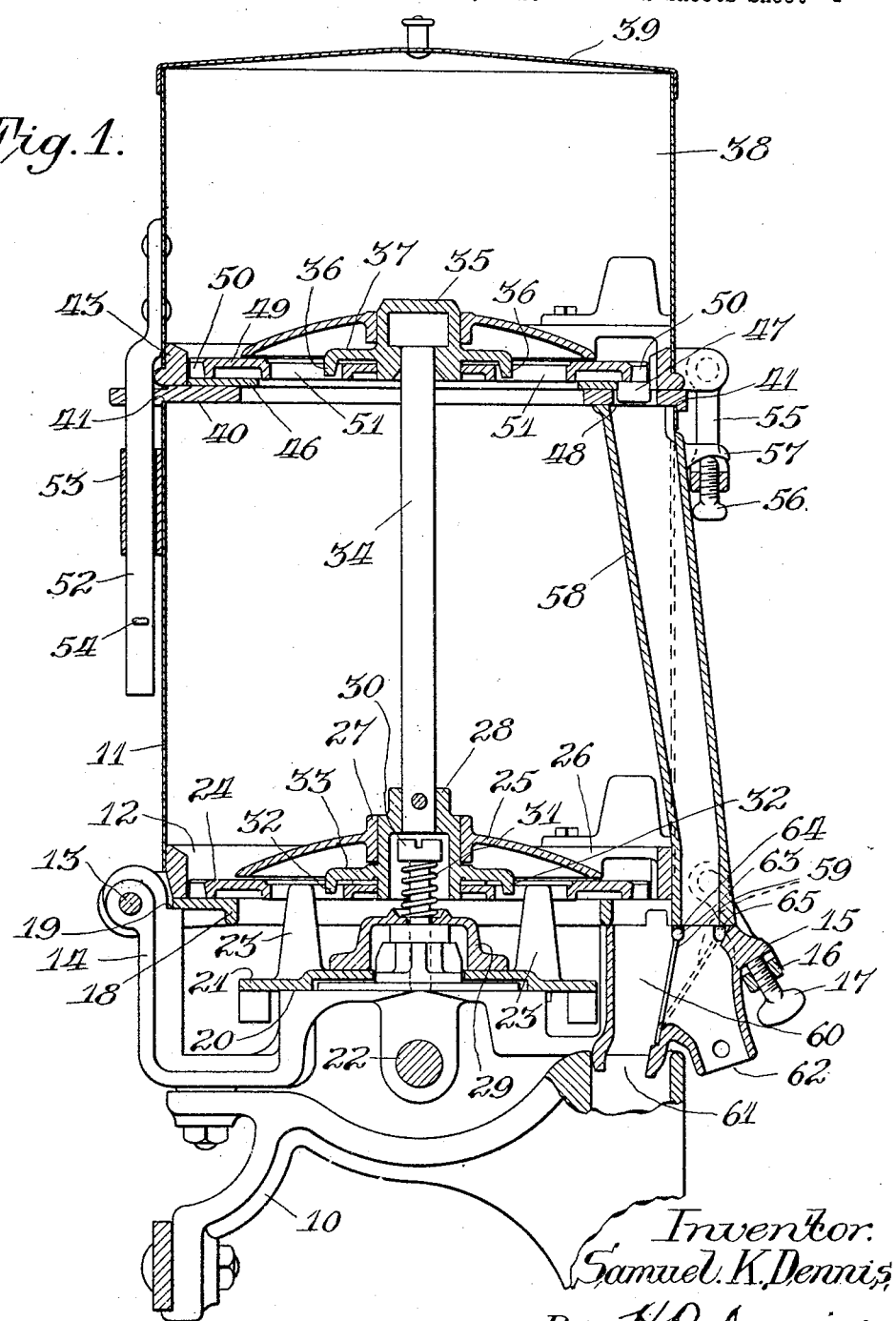
Fig. 1 is a central vertical section through the hoppers of the illustrative dispensing mechanism showing the means for mounting the upper hopper upon the main hopper.

In the illustrative mechanism the hoppers are supported upon a corn planter runner frame 10 to which the lower hopper 11 with its bottom plate 12 is hinged. The hinge pintle is shown at 13 as being mounted in the base frame 14 bolted upon the runner frame of the planter. Upon the opposite side of the hopper from the hinge is a locking device comprising the lug 15 projecting from the base frame and a locking member 16 carrying a set screw 17 and pivoted to the main hopper 11.

A circular base plate 18 rests upon a circular ledge 19 formed in the base frame 14. The plate acts as a support for the rotating seed selecting ring to be mentioned below. The base frame is formed with another ledge 20 for rotatively supporting a seed ring driving gear 21 operated by a seed shaft 22 through suitable interposed gearing. The gear 21 is operatively connected by means of lugs 23 with the seed selecting ring 24 which is formed with suitable openings through which the lugs 23 extend. Seeds are kept from passing through these openings by the central arched portion 25 of the bottom plate 12, this arched portion extending outwardly toward the periphery of the seed ring 24.

Radial arches, such as that shown at 26, connect the outer ring 12 of the bottom plate with the central arched portion 25.

A central sleeve 27 is formed in the arched portion 25 of the bottom plate 12 for receiving a cap 28 which performs a dual function. It acts as a coupling connection for transmitting rotation from the seed ring 24 to dispensing mechanism for the upper hopper, and houses devices for yieldingly holding the gear 21 in operative position. The latter devices include a cap 29 engaging the gear 21, a bolt 30 screw threaded into the base frame 14, and a coil spring 31 interposed between the head of the bolt 30 and the cap 29. For acting as a power transmitting coupling, the cap 28 is rotatively mounted within the member 25, extends centrally through the seed ring 24, and has driving lugs 32 extending downwardly through the seed ring from a flange 33 lying between the seed ring and the member 25.

Non-rotatively secured within the upper part of the cap 28 is a square shaft 34 for driving the dispensing mechanism for the upper hopper. This dispensing mechanism is substantially similar to that of the main hopper 11 and is co-axial therewith. It includes a central cap 35 which is hollow and formed at its lower end with a square opening for slidably receiving the upper end of the shaft 34 from which it receives movement. Spaced radially outwardly from the central portion of this cap are downwardly extending driving lugs 36 integral with the flange 37.

The upper hopper 38 having the detachable cover 39 is of the same cross section as the main hopper and is supported thereon by a base ring 40, which is of greater diameter, so as to extend outwardly beyond the sides of the hopper, the upper end of which is received within a circular flange 41. This flange has opposite cut-out portions 42 and the ring 40 is formed with openings, the purpose of which will receive reference below.

The bottom plate 43 of the upper dispensing mechanism is substantially similar to the plate 12, having a central arched portion formed with a central sleeve. The upper hopper is secured directly to the rim of this plate so as to rest thereon, and the base ring 40 is held against this rim by latches 44 pivotally supported in bosses 45 formed integrally with the rim, as clearly shown in Fig. 2 of the drawings. These latches pass through the notches 42 in the flange of the base ring 40.

Seated upon the base ring 40 within the rim of the bottom plate 43 is a filler plate 46 secured against rotation by a depending lug 47 extending downwardly through the opening 48 in the base ring. The seed plate 49 having the seed cells 50 and slots 51 is rotatively mounted on the filler plate. Rotation is imparted to the seed plate by the lugs 36 of the coupling cap 35, these lugs extending downwardly through the slots 51 in the seed plate.

To permit the upper hopper to be swung aside to the position shown in Fig. 2, it is mounted on the main hopper by means of a vertical spindle 52 rigidly secured at its upper end to the side of the upper hopper. A sleeve 53 secured to the main hopper surrounds this spindle so as to permit lengthwise sliding movement and rotation of the spindle therein. A stop 54 limits the upward movement of the hopper 38 away from the main hopper. Opposite the spindle 52 is a locking device comprising the pivoted latch member 55 having a set screw 56 for engaging a lug 57 formed upon the auxiliary seed chute 58, which extends downwardly from the upper dispensing mechanism and is riveted to the side of the main hopper.

It will be apparent from the above description that the main hopper may be uncovered by releasing the set screw 56, swinging the latch member 55 aside, elevating the hopper 38 so that the cap 35 slides out of contact with the shaft 34, and then swinging the hopper around to the position shown in Fig. 2, the spindle 52 turning within the sleeve 53. This manner of removing the auxiliary, or upper, hopper from operative position eliminates all liability of spilling its contents when it is desired to replenish the supply of seeds in the main hopper.

The illustrative apparatus provides means whereby seed dispensed from the two hoppers may be discharged through the same discharge chute or through different chutes, as may be desired. To this end, an adjustable deflector 59 is mounted within a chamber 60 formed in the base frame 14. This chamber has two outlets 61 and 62 to either of which seeds discharged through the auxiliary chute 58 may be directed by the deflector. In order to accomplish this result, the deflector is formed with a horizontal spindle 63 at its upper end. The ends of this spindle project beyond the vertical edges of the deflector and are adapted to be mounted within either of two pairs of opposite notches 64 and 65, respectively. When the spindle is mounted in the notches 64, seeds from the respective hoppers are discharged through the separate outlets 61 and 62, corn for instance, discharging through the outlet 61, and peas from the auxiliary hopper passing out through the outlet 62. If on the other hand, the spindle is mounted in the notches 65, both kinds of seeds pass through the same outlet 61 and are planted in the same hills.

In the operation of the illustrative dispensing mechanism, rotation is imparted to the seed shaft 22 by the ground wheels of the planter. This shaft is geared to the seed plate gear 21, which by means of the lugs 23, transmits its rotation to the seed plate 24 of the dispensing mechanism for the main hopper. The rotation of this plate is transmitted to the auxiliary hopper dispensing mechanism by the square shaft 34 and the coupling caps at either end thereof. The manner in which the seed plates discharge seeds through the hopper outlets will be clear to those skilled in the art from an inspection of the drawings.

In case the use of the auxiliary hopper is not desired, it may be bodily removed by releasing the latch mechanism 55 and removing the cotter pin 54 from the spindle 52. The cover 39 of the auxiliary hopper may then be placed upon the main hopper and the planter used to plant only one kind of seed. It will be understood that access to the driving mechanism of the main hopper may be had by releasing the latch 16 and swinging the hopper aside on the hinge 13.

From the foregoing description it will be seen that there is provided an effective and simplified multiple dispensing device which may readily be adapted to the varying needs of the user, which ocupies a minimum of space, and which is extremely satisfactory in use. While I have disclosed one specific embodiment of my invention it will be understood that variations therefrom may be made as occasion warrants, within the scope of the following claims.

What I claim is:

1. The combination of a main hopper, an auxiliary hopper superposed with relation to the main hopper, dispensing mechanism in each hopper, a discharge chute in communication with each dispensing mechanism, means for driving both dispensing mechanisms, and means for mounting the auxiliary hopper so that it may be bodily lifted to disconnect the drive for its dispensing mechanism and thereafter swung aside so as to uncover the main hopper and permit access thereto.

2. The combination of a support, a hopper hinged to the support, a second hopper slidably and rotatively mounted relative to the first hopper, dispensing mechanism in each hopper, and means for driving the dispensing mechanisms in unison, said driving means and said second hopper mounting being so arranged that the second hopper may be bodily lifted to disconnect its dispensing mechanism and thereafter swung aside to allow access to the first hopper while the second hopper remains in vertical position.

3. A multiple dispensing device for planters comprising a lower hopper, an upper hopper vertically slidably and rotatively mounted on the lower hopper, dispensing mechanism in each hopper, a drive shaft extending upwardly from the dispensing mechanism in the lower hopper, and a coupling element at each end of said drive shaft readily removable from the adjacent dispensing mechanism.

4. The combination of axially aligned superposed hoppers, dispensing mechanism in each hopper, a discharge throat in co-operative relation with each dispensing mechanism, a discharge chute extending downwardly from the discharge throat for the upper hopper to a position adjacent to the discharge throat for the lower hopper, and means for directing the discharged material from the separate hoppers through a single outlet or through separate outlets.

5. In a dispensing mechanism, axially aligned superposed hoppers, a dispensing mechanism in each hopper, means for driving said dispensing mechanisms in unison, chutes and deflecting means for directing the material discharged from said hoppers through the same or through different discharge chutes, and means for readily detaching the upper hopper from the lower hopper.

6. A multiple dispensing device for planters, comprising a lower hopper, an upper hopper provided with a base seated upon the top of the lower hopper, seed dispensing mechanism in each hopper, means for driving both dispensing mechanisms in unison, and means for swingably mounting said upper hopper upon the lower hopper, said means including a vertical spindle rigidly attached at its upper end to the upper hopper and having its lower end slidably and rotatively mounted with respect to the lower hopper.

7. A multiple dispensing mechanism comprising, in combination, a main dispensing unit, a second dispensing unit, a discharging element for each unit, means for operating the discharging elements, a hopper for each unit, and mounting devices for supporting one hopper above the other so that the upper hopper may be moved to uncover the lower hopper without tipping.

8. The combination of a main hopper, an auxiliary hopper superposed with relation to the main hopper, dispensing mechanism in each hopper, a discharge chute for each dispensing mechanism, means for driving both dispensing mechanisms, and means for mounting the auxiliary hopper so that it may be bodily lifted to disconnect the drive for its dispensing mechanism and thereafter moved so as to uncover the main hopper without tipping the auxiliary hopper.

9. The combination of a support, a hopper mounted on the support, a second hopper movably mounted relative to the first hopper, dispensing mechanism in each hopper, means for driving the dispensing mechanisms, and mounting means including a vertical spindle fixed to the second hopper and so arranged that the second hopper may be bodily lifted to disconnect its dispensing mechanism and thereafter swung aside to allow access to the first hopper while the second hopper remains in vertical position.

10. A multiple dispensing device for planters comprising a lower hopper, an upper hopper vertically slidably mounted on the lower hopper, dispensing mechanism in each hopper, a drive shaft extending upwardly from the dispensing mechanism in the lower hopper, and means connecting the dispensing mechanism of the upper hopper with the drive shaft.

11. A dispensing mechanism comprising, in combination, an upper hopper, a lower hopper, dispensing mechanism in each hopper, a discharge outlet for each dispensing mechanism, a discharge chute extending downwardly from the outlet for the upper hopper through the lower hopper to a position adjacent to the outlet for the lower hopper, and a deflector for directing the discharged material from the upper hopper through the same outlet as that to which the material from the lower hopper passes or through a separate outlet at the will of the operator.

12. In a dispensing mechanism, an upper hopper, a lower hopper, a dispensing mechanism in each hopper, means for driving said dispensing mechanisms in unison, chutes and deflecting means for directing the material discharged from said hoppers through the same or through different discharge chutes, and means for readily moving the upper hopper so as to uncover the lower hopper without tipping the upper hopper.

13. A multiple dispensing device for planters, comprising a lower hopper, an upper hopper provided with a base seated upon the top of the lower hopper and forming a cover therefor, seed dispensing mechanism in each hopper, means for driving both dispensing mechanisms in unison, and means for swingably mounting said upper hopper upon the lower hopper, said means including a vertical spindle rigidly attached to the upper hopper and being slidably and rotatively mounted with respect to the lower hopper.

In testimony whereof I affix my signature.

SAMUEL K. DENNIS.